US011513812B2

(12) United States Patent
Aggarwal et al.

(10) Patent No.: US 11,513,812 B2
(45) Date of Patent: Nov. 29, 2022

(54) TARGETED DATA EXTRACTION SYSTEM AND METHOD

(71) Applicant: Sam Houston State University, Huntsville, TX (US)

(72) Inventors: Sudhir Aggarwal, Tallahassee, FL (US); Gokila Dorai, Tallahassee, FL (US); Umit Karabiyik, Huntsville, TX (US); Tathagata Mukherjee, Tallahassee, FL (US); Nicholas A Guerra, Huntsville, TX (US); Manuel Hernandez-Romero, Tallahassee, FL (US); James Parsons, Tallahassee, FL (US); Khushboo Rathi, Huntsville, TX (US)

(73) Assignees: Sam Houston State University, Huntsville, TX (US); Florida State University Research Foundation, Inc., Tallahassee, FL (US)

( * ) Notice: Subject to any disclaimer, the term of this patent is extended or adjusted under 35 U.S.C. 154(b) by 305 days.

(21) Appl. No.: 16/735,092

(22) Filed: Jan. 6, 2020

(65) Prior Publication Data

US 2020/0218546 A1 Jul. 9, 2020

Related U.S. Application Data

(60) Provisional application No. 62/788,770, filed on Jan. 5, 2019.

(51) Int. Cl.
*G06F 9/00* (2006.01)
*G06F 15/177* (2006.01)
(Continued)

(52) U.S. Cl.
CPC .......... *G06F 9/4416* (2013.01); *G06F 9/4406* (2013.01); *G06F 16/9035* (2019.01); *H04L 9/0643* (2013.01); *H04W 4/80* (2018.02)

(58) Field of Classification Search
CPC .............................. G06F 9/4416; G06F 9/4406
See application file for complete search history.

(56) References Cited

U.S. PATENT DOCUMENTS 6,724,871 B2 * 4/2004 Maytal ................ H04L 12/2872
379/93.08
9,582,230 B1 * 2/2017 Sankaran ............. G06V 30/412
(Continued)

OTHER PUBLICATIONS

Lawton, et al., "E-discovery in digital forensic investigations," Technical Report CAST publication, Tech. Rep., 2014.
(Continued)

*Primary Examiner* — Mohammed H Rehman
(74) *Attorney, Agent, or Firm* — Kowert, Hood, Munyon, Rankin & Goetzel, P.C.; Gareth M. Sampson (57) ABSTRACT

Many mobile devices are used for documenting different scenarios that are encountered by the users as they go about their daily lives. In many situations, a mobile device may be used to document the scenario. This data may be of significant forensic interest to an investigator. In many situations, the owner of the phone may be willing to provide the investigator access to this data (through a documented consent agreement). Such consent is usually contingent upon the fact that not all the data available on the phone may be extracted for analysis, either due to privacy concerns or due to personal reasons. Courts have also opined in several cases that investigators must limit data extracted, so as to focus on only "relevant information" for the investigation at hand. Thus, only selective (or filtered) data should be extracted as per the consent available from the witness/victim (user). Described herein is the design and implemen-
(Continued)

tation of such a targeted data extraction system (TDES) for mobile devices. The TDES assumes consent of the user and implements state of the art filtering using machine learning techniques. This system can be used to identify and extract selected data from smart phones, in real time at the scene of the crime.

17 Claims, 6 Drawing Sheets

(51) Int. Cl.
  *G06F 9/4401* (2018.01)
  *H04W 4/80* (2018.01)
  *H04L 9/06* (2006.01)
  *G06F 16/9035* (2019.01)

(56) References Cited

U.S. PATENT DOCUMENTS

| | | | |
|---|---|---|---|
| 2009/0075633 A1* | 3/2009 | Lee | H04M 1/72469 348/E7.083 |
| 2010/0161410 A1* | 6/2010 | Tulloch | G06Q 30/02 709/224 |
| 2011/0314035 A1* | 12/2011 | Brunet | G06F 16/172 709/206 |
| 2013/0183951 A1* | 7/2013 | Chien | H04W 4/50 455/418 |
| 2015/0381269 A1* | 12/2015 | Deyle | G06F 3/1454 455/41.2 |
| 2018/0067834 A1* | 3/2018 | Sakurai | G06F 11/3447 |

OTHER PUBLICATIONS

Khan, et al., "Network forensics: Review, taxonomy, and open challenges," Journal of Network and Computer Applications, 2016.

Roussev, "Forensic acquisition of cloud drives," arXiv preprint arXiv:1603.06542, 2016.

Mutawa, et al., "Forensic analysis of social networking applications on mobile devices," Digital Investigation, vol. 9, pp. S24-S33, 2012.

Anglano, "Forensic analysis of whatsapp messenger on android smartphones," Digital Investigation, vol. 11, No. 3, pp. 201-213, 2014.

Husain, et al. "A simple cost-effective framework for iphone forensic analysis," in Digital Forensics and Cyber Crime. Springer, 2010, pp. 27-37.

Quick, et al., "Forensic analysis of the android file system yaffs2," 2011.

Roussev, "Real-time digital forensics and triage," Digital Investigation, vol. 10, No. 2, pp. 158-167, 2013.

Cantrell, et al., "Research toward a partiallyautomated, and crime specific digital triage process model," Computer and Information Science, vol. 5, No. 2, p. 29, 2012.

Scrivens, et al., "Android digital forensics: data, extraction and analysis," in Proceedings of the ACM Turing 50th Celebration Conference—China. ACM, 2017, p. 26.

Aminnezhad, et al., "A survey on privacy issues in digital forensics," IJCSDF, vol. 1, No. 4, pp. 311-323, 2012. Aminnezhad.

Stirparo, et al., "The mobileak project: Forensics methodology for mobile application privacy assessment," in Internet Technology and Secured Transactions, 2012 International Conference for. IEEE, 2012, pp. 297-303.

Murphy, Machine learning: a probabilistic perspective. MIT press, 2012.

Lecun, et al., "Deep learning," nature, vol. 521, No. 7553, 2015.

Krizhevsky, et al., "Imagenet classification with deep convolutional neural networks," in Advances in neural Information processing systems, 2012.

Cho, et al., "Learning phrase representations using mn encoder-decoder for statistical machine translation," arXiv preprint arXiv:1406.1078, 2014.

Jia, et al., "Caffe: Convolutional architecture for fast feature embedding," in Proceedings of the 22nd ACM international conference on Multimedia. ACM, 2014, pp. 675-678.

Bergstra, et al., "Theano: Deep learning on gpus with python," in NIPS 2011, BigLearning Workshop, Granada, Spain, vol. 3. Citeseer, 2011.

Abadi, et al., "Tensorflow: a system for large-scale machine learning." in OSDI, vol. 16, 2016, pp. 265-283.

Szegedy, et al., "Rethinking the inception architecture for computer vision," in Proceedings of the IEEE Conference on Computer Vision and Pattern Recognition, 2016, pp. 2818-2826.

Howard, et al., "Mobilenets: Efficient convolutional neural networks for mobile vision applications," arXiv preprint arXiv:1704.04861, 2017.

\* cited by examiner

TARGETED DATA EXTRACTION SYSTEM AND METHOD

PRIORITY CLAIM

This application claims priority to U.S. Provisional Application Ser. No. 62/788,770 entitled "TARGETED DATA EXTRACTION SYSTEM" filed Jan. 5, 2019, which is incorporated herein by reference in its entirety.

STATEMENT REGARDING FEDERALLY SPONSORED RESEARCH OR DEVELOPMENT

This invention was made with government support under 2016-MU-CX-K003 awarded by U.S. Department of Justice. The government has certain rights in the invention.

BACKGROUND OF THE INVENTION

1. Field of the Invention

The invention generally relates to extraction of data from mobile devices.

2. Description of the Relevant Art

With the rapid growth of smartphones and tablets, it is becoming essential for law enforcement to effectively conduct forensic analysis on such devices. These mobile devices now have so much data on them that they have in essence become personal data repositories and the privacy of this data is a serious concern. A recent ruling of the US Supreme Court (*Riley v California* (573 U.S. [2014])) and subsequent rulings arising from this landmark case indicate that in order to search a smartphone, it may not be enough to have a warrant for the search but it may also be required to restrict the search to the specific items on the device that relate to the crime being investigated.

In many incidents that happen, for example an accident scenario, someone maliciously texting a victim, a multiple shooting videotaped by many bystanders, etc., a mobile device may have captured significant data that is of forensic interest to an investigator and the owner of the device may wish to provide the investigator the data (through a consent form). However, the owner may be reluctant to have all the data on the phone extracted for analysis due to privacy concerns and personal reasons. Thus, only selective (or filtered) data should be extracted.

To the best of our knowledge there are no tools that are capable of doing online targeted data extraction. All the tools currently available commercially or otherwise create a complete backup of the device and allow the investigator to query the backup offline. Moreover, none of these tools have the capability of filtering data based on machine learning based content filters.

There are a number of tools available for full data acquisition from Android and iOS based devices. Some of the most important commercial tools for smartphone forensics are: Cellebrite UFED Physical Analyzer, Paraben Electronic Evidence Examiner, Oxygen Forensic, AccessData Mobile Phone Examiner Plus, Microsystems XRY, Magnet Acquire, and Blackbag Mobilyze. These tools aim to acquire as much data as possible for further analysis and provide both physical and logical acquisitions. Nevertheless, on-line or off-line selective data acquisition methods have not yet been integrated into such tools.

There has been considerable research on forensic data extraction and analysis in the last decade. Some of this work is targeted towards extraction of information about specific types of artifacts, for example acquisition of data from cloud drives or social networking applications. Other work has been directed towards general forensic extraction issues for mobile devices. In the last few years the idea of "real time triage" has become important and there has been some work on frameworks for building such systems. Another aspect of forensics that have garnered the attention of researchers is that of privacy both in the contest of digital forensics in general and mobile forensics in particular.

Machine Learning and its applications have gained a lot of attention lately. Deep Learning refers to the development of models based on training neural networks and has been successfully applied for building systems that have been able to better the performance of humans in areas as diverse as image recognition to natural language translation. More recently open source frameworks like CAFFE, Theano and TensorFlow have been developed which can be used for implementing deep representational learning using neural networks. Furthermore with the advent of smartphones that are equipped with state of the art processors it is now possible to run trained models for deep representational learning on these phones for several different tasks such as face detection, image analysis and classification, using models such as Inception, NSFW, and MobileNet.

Because of the deficiencies of the current commercial data extraction software, it is desirable to develop a forensically sound system that can perform targeted (selective) data extraction.

SUMMARY OF THE INVENTION

In some embodiments, a novel forensically sound system is described that can do targeted (selective) data extraction. In one embodiment, a prototype software system that perform targeted data extraction from mobile devices (iOS or Android based) in a forensically sound manner is described. The system runs on a solid-state drive connected to a laptop, which in turn is connected to a mobile device to which an app is downloaded. In an embodiment of the software system, the software reduces the number of files collected through both analysis of the file metadata as well as analysis of the content of the files.

The herein described system and method of extracting data provides a number of advantages. The data extraction is implemented through a fast and efficient selective data extraction system (TDES). Filtering definitions are performed through software with a custom flexible user interface. Only the required selected data is exported from the mobile device. Metadata filtering rules, such as the specific date & time, location and type of data to be extracted can be used for selective extraction of the data. Content-based filtering using artificial intelligence (AI) and machine learning techniques such as exclusion or inclusion of pictures having pornographic content or messages that are abusive in nature is also implemented. A secure communications protocol is used for data transfer. The data extraction system and method include enforcement protocols to establish a proper chain-of-custody approach with appropriate guarantees of evidence preservation that have probative value in a court of law. The software implements a digital consent form signed through the app itself by the owner of the device.

In an embodiment, a system includes three different subsystems: a data identification system, a data acquisition system and data validation system.

The data identification system is responsible for identifying the relevant files based on metadata and content. Input to this system is broadly driven by a consent form and fine-tuned by the investigator using a user interface that we have designed for this purpose. Data on the smartphones consists of several different types: photos (images), videos, messages, contact lists, etc. These are considered as the basic categories of data. Each category is associated with metadata that describes aspects of the data such as time (when was that image put on the device), location (where was the image taken), sender and receiver (for text and multimedia messages) etc. Note that the metadata is different from the content. As a concrete example, photos can be extracted based on date ranges such as "photos taken within the last week." This query uses metadata about photos. However, if the search requires only photos containing weapons, then content-based filtering is performed. The identification system uses state of the art algorithms in machine learning, natural language processing and data mining for this content-based filtering.

The data acquisition system interacts with the identification system to retrieve targeted files in one or more phases from a target smartphone, in a forensically sound manner. Acquisition includes what is often termed data collection, so that after this step, the acquired data is the desired evidence. The data acquisition system includes two parts: a system-on-chip called the TDES manager which resides on a portable boot drive and the TDES app to be deployed on the phone. The TDES manager boots up in a computer operating system when connected to any laptop or computer. The target smartphone is connected to the same laptop or computer and the TDES app is downloaded from the TDES manager onto the target smartphone. The app user interface (UI) allows the investigator to provide the input to the data identification system. Finally, the filtered data from the target phone is transferred to the TDES manager.

The data validation system ensures that: (1) data is transferred in a forensically sound manner and it includes appropriate hashing to insure data integrity; (2) a log timeline can be generated that documents the steps taken by the TDES system during the "live analysis;" and (3) a report is generated that documents needs of investigators such as queries, data analysis performed and data selected. Note that the data validation system is integrated into the identification system and the acquisition system. Additionally, transfer of data to the portable boot drive, instead of into a computer/laptop system, will help ensure that the data is isolated from the computer system. This is important for maintaining data in confidence and to help control access to the data.

In one embodiment, a portable device is used for selective extraction of data from a mobile device. The portable device is couplable to a computer system. The portable device includes a memory medium, wherein the memory medium has a targeted data extraction manager and a targeted data extraction app stored therein. When coupled to a computer system, the targeted data extraction manager boots up in the computer system and installs the targeted data extraction app onto the mobile device.

The targeted data extraction app includes a data identification component. The data identification component is configured to identify data on the mobile device according to a user's search criteria. The targeted data extraction app further includes a data acquisition component, the data acquisition component configured to extract only the data identified by the data identification component from the mobile device. The targeted data extraction app further includes a data transfer component. The data transfer component is configured to send the extracted data to the portable boot drive component. The data extraction app further includes a data validation component. The data validation component is configured create one or more validation files which include information that can be used to detect errors during transferring of the extracted data from the mobile device to the portable boot drive component and/or tampering of the extracted data.

In an embodiment, the data transfer system transfers data from the mobile device to the portable boot drive component via a wireless connection. In an embodiment, the portable boot drive component is a USB drive. In an embodiment, the portable boot drive component comprises a boot loader for the operating system of the computer system.

The one or more validation files may be hash files. In an embodiment, a hash file is generated for each data file extracted.

In an embodiment, the targeted data extraction app includes a user interface that is displayed on the mobile device during use.

In an embodiment, the targeted data extraction app provides a consent form on a display of the mobile device, wherein the consent form is signed, during use, by the owner of the phone, to allow release of the extracted data.

In an embodiment, the targeted data extraction app comprises a preview component that allows a user to review the extracted data before sending the data to the portable boot drive component.

In an embodiment, a method for selective extraction of data from a mobile device, includes coupling a portable device onto a computer system, wherein the portable device comprises a memory medium, wherein the memory medium has a targeted data extraction manager and a targeted data extraction app stored therein. The method also includes coupling the mobile device to the computer system. Once the respective devices are coupled to the computer system, the targeted data extraction manager is run on the computer system. The targeted data extraction manager installs the targeted data extraction app from the portable device on to the mobile device.

The targeted data extraction app is run on the mobile device, wherein the targeted data extraction app creates a user interface on the mobile device. The user creates a search query for extraction of data from the mobile phone using the user interface. The data selected by the user through the user interface is extracted from the mobile device. The targeted data extraction app extracts only the data selected by the user from the mobile device.

In some embodiments, targeted data extraction app creates one or more validation files which include information that can be used to detect errors during transferring of the data extracted from the mobile device to the portable boot drive component and/or tampering of the data extracted from the mobile device.

The data extracted from the mobile device and the one or more validation files are transferred to the portable device. In one embodiment, the data extracted from the mobile device is transferred from the mobile device to the portable boot drive component via a wireless connection.

In one embodiment, the method further includes providing a consent form on a display of the mobile device, wherein the consent form is signed, during use, by the owner of the phone, to allow release of the extracted data.

In one embodiment, the method further includes presenting a preview of the data selected by the user on the mobile phone before sending the data to the portable device.

BRIEF DESCRIPTION OF THE DRAWINGS

Advantages of the present invention will become apparent to those skilled in the art with the benefit of the following detailed description of embodiments and upon reference to the accompanying drawings in which.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

In an embodiment, a system includes three different subsystems: a data identification system, a data acquisition system and data validation system. For ease of discussion, since the data identification system and the acquisition system are highly coupled, the systems together are herein referred to as the "targeted data extraction system."

The targeted data extraction system is designed to accommodate most, if not all, potential scenarios that require an investigator to extract data from a mobile device. Such scenarios include but are not limited to: (1) a car accident where a bystander has taken photos or a video of what occurred; (2) an overdosing incident with information on the phone about dealers and drugs; (3) a suicide where the victim's phone may contain relevant text/photos; (4) a couple break up followed by harassment or domestic violence with photos of abuse; (5) a mass incident where many individuals have captured videos or photos with the goal to analyze these to locate the possible perpetrators and the devices used in the attack.

For example, in several cases of shootings, bystanders or companions recorded the interaction on their smartphones. In the case of the Boston marathon bombings, the amount of digital evidence was overwhelming and automated selective data extraction may have been very useful. The different types of data that might be of use to the forensic investigator can be classified as follows: (1) user created data such as contacts and address book, SMS, MMS, calendar, voice memos, notes, photographs, video/audio files, maps and location info, voice mails and stored files; (2) internet related data such as browsing history, emails, and social networking data; (3) third party application data such as messaging data (text, voice, video, pictures) from applications such as WhatsApp, Facebook, Skype, etc.

In one embodiment, the data acquisition system includes two parts: a system-on-chip called the TDES manager which resides on a portable boot drive and the TDES app to be deployed on the phone. The TDES manager boots up in a computer operating system when connected to any laptop or computer. The target smartphone is connected to the same laptop or computer and the TDES app is downloaded from the TDES manager onto the target smartphone. The app user interface (UI) allows the investigator to provide the input to the data identification system. Finally, the filtered data from the target phone is transferred to the TDES manager.

The "TDES app" is deployed on the target device and is responsible for filtering and transferring the data to the "TDES manager". This will be referred to herein as "On-device Acquisition." Using the TDES app, only information that the app filters out is actually transferred from the phone. No other data on the phone is ever pushed to the manager. For some data types on an iOS device, it is not possible to selectively extract the relevant data without either "jailbreaking" the iOS device or using the backup system. In such a situation, the backup system is used for selective extraction. This is herein referred to as "backup acquisition." In this latter case, the data is initially moved to the TDES manager before selectively extracting the required data and then deleting the backup stored on the TDES manager.

TABLE I

On-Device Metadata based Extraction

| Category of Data | Metadata Type | iOS | Android |
|---|---|---|---|
| Photos | Date & Time | Yes | Yes |
| Photos | Location | Yes | Yes |
| Photos | Album Type | Yes | Yes |
| Videos | Date & Time | Yes | Yes |
| Videos | Location | Yes | Yes |
| Contacts | Name | Yes | Yes |
| Contacts | Number | Yes | Yes |
| Contacts | Area Code | Yes | Yes |
| Contacts | Email | Yes | Yes |
| Calendar Events | Date | Yes | Yes |
| Reminders | Date | Yes | Yes |
| Photos | Third Party Apps | No | Yes |
| Messages/SMS/MMS | Date Time | No | Yes |
| Messages/SMS/MMS | Contact Number | No | Yes |
| Call Logs | Incoming Calls | No | Yes |
| Call Logs | Outgoing Calls | No | Yes |
| Call Logs | Missed Calls | No | Yes |
| Call Logs | Date Time | No | Yes |
| Notes | Search String | No | No |
| Notes | Date & Time | No | No |
| Voice Memos | Date & Time | No | No |
| Web History | Date & Time | No | No |
| Emails | Date & Time | No | No |
| Facebook Messages | Date & Time | No | No |
| Whatsapp Messages | Date & Time | No | No |
| LinkedIn Messages | Date & Time | No | No |
| WeChat Messages | Date & Time | No | No |
| Viber Messages | Date & Time | No | No |

TABLE II

Off-Device Metadata based Extraction

| Category of Data | Metadata Type | iOS | Android |
|---|---|---|---|
| Photos | Date & Time | Yes | Yes |
| Photos | Location | Yes | Yes |
| Photos | Album Type | Yes | Yes |
| Videos | Date & Time | Yes | Yes |
| Videos | Location | Yes | Yes |
| Contacts | Name | Yes | Yes |
| Contacts | Number | Yes | Yes |
| Contacts | Area Code | Yes | Yes |
| Contacts | Email | Yes | Yes |
| Calendar Events | Date | Yes | Yes |
| Reminders | Date | Yes | Yes |
| Photos | Third Party Apps | Yes | Yes |
| Messages/SMS/MMS | Date Time | Yes | Yes |
| Messages/SMS/MMS | Contact Number | Yes | Yes |
| Call Logs | Incoming Calls | Yes | Yes |
| Call Logs | Outgoing Calls | Yes | Yes |
| Call Logs | Missed Calls | Yes | Yes |
| Call Logs | Date Time | Yes | Yes |
| Notes | Search String | Yes | No |
| Notes | Date & Time | Yes | No |
| Voice Memos | Date & Time | Yes | No |
| Web History | Date & Time | Yes | No |
| Emails | Date & Time | Yes | No |
| Whatsapp Messages | Date & Time | Yes | No |
| Facebook Messages | Date & Time | * | No |
| LinkedIn Messages | Date & Time | * | No |
| WeChat Messages | Date & Time | * | No |
| Viber Messages | Date & Time | * | No |

Online Metadata Based Filtering

Table I shows what the TDES app on-device can extract using metadata filtering. The table shows what information can be extracted from iOS devices and Android phones. For example, photos captured by third party apps such as Facebook or WhatsApp can be extracted from Android phones but not from iOS devices. The table also indicates that there is some data that the TDES app currently cannot extract from either iOS or Android phones. Table II shows what can be done off-device and will be discussed further in a later section.

Filtering for iOS

Figure 1:
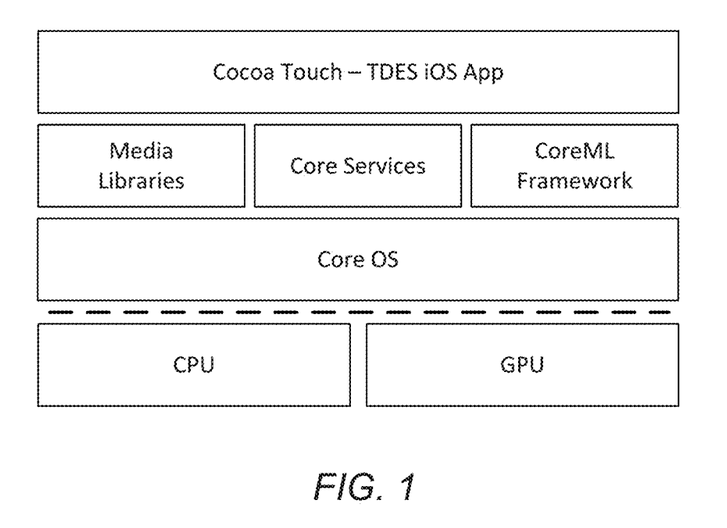
FIG. 1 depicts a schematic diagram of iOS framework.

System interfaces for iOS devices are delivered in the form of packages referred to as frameworks. See FIG. 1 which depicts a schematic diagram of iOS framework. In the TDES iOS app we use frameworks in Media Libraries and Core Services. The Photos framework provides direct access to the photo and video assets managed by the iOS device Photos app. The AVKit framework provides a high-level interface for playing video content. The Core Location framework provides location and heading information to apps. The EventKit framework provides an interface for accessing calendar events on a user's device. The Contacts framework provides access to the user's contacts and functionality for organizing contact information.

Filtering for Android

Figure 2:
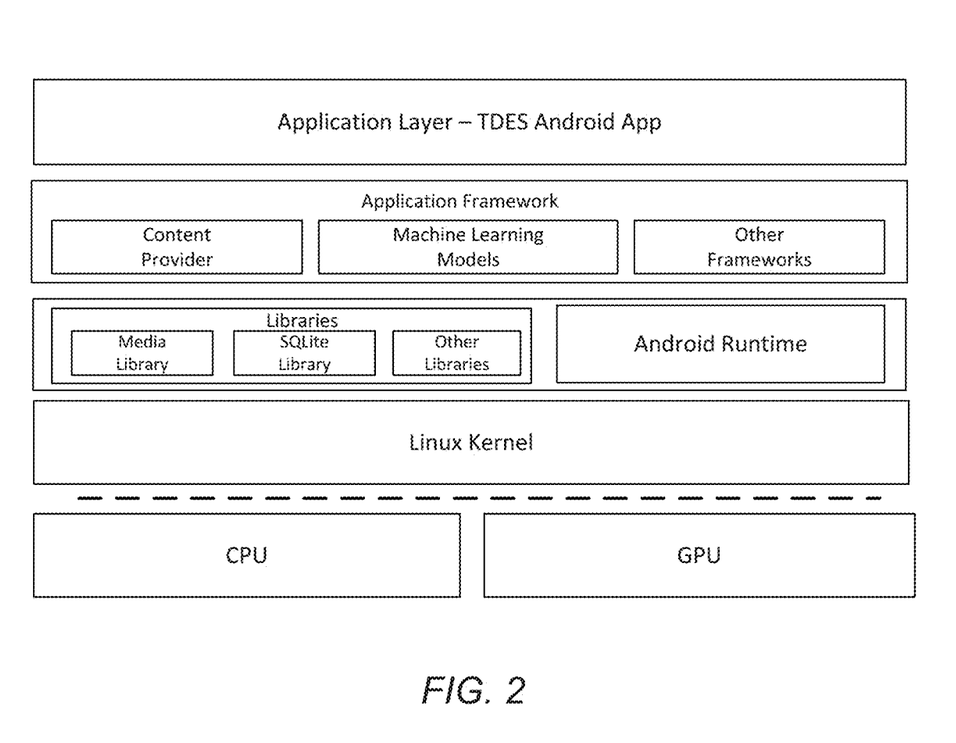
FIG. 2 depicts a schematic diagram of an Android operating system stack.

The Android operating system stack is shown in FIG. 2. The TDES Android app is deployed in the Application Layer and uses services provided by the Application Framework which includes the Content Provider, Activity Manager, Resource Manager and the View system. The Content Provider service provides access to a range of data and other services and is used for design and implementation.

On-Device Content Based Filtering

Trained machine learning (ML) models are developed through any supervised ML technique, including learning using deep neural nets. Models can be used that have been developed by others and are open source, improved for accuracy by retraining or developed from scratch using large amounts of training data. A trained model can be incorporated into an app (iOS or Android) by using an appropriate framework. Exemplary trained models that can be used include, but are not limited to, Inception-v3, MobileNet and OpenNSFW, each of which can be incorporating into the TDES app for various classification problems using photos and videos. ML models allows the TDES app to identify photos containing specific features, such as weapons, people, vehicles, drugs, websites, skin exposure and gadgets.

For iOS based devices, on-device content based filtering may be performed using the CoreML framework. CoreML includes support for various ML frameworks like Vision and GameplayKit.

For Android based devices, on-device based filtering may be performed using the TensorFlow Lite framework. The trained model and related labels are used in conjunction with a shared object file (libtensorflow_inference.so) written in C++. To interface with the Android platform a JAVA API (libandroid_tensorflow_inference_java.jar) may be used.

Off-Device (Backup) Based Filtering

For iOS devices a backup may be used to cover the categories in Table I for which on-device acquisition cannot be done. See Table II for a complete list. iOS security mechanisms don't allow applications running on-device to extract certain types of content. For backup acquisition the idevicebackup2 is used, which is contained in the libimobiledevice suite of tools, which is open source and free. There are other standard techniques which, although complex, may also be used to obtain data from the backup.

For Android based phones everything that can be filtered off-device can be done on-device. In Table I there are third party applications whose data cannot be retrieved using on-device acquisition for Android phones when the device is not rooted. See also Table II for a list of information that can be acquired from Android phones off-device.

TDES Communication

Figure 3:
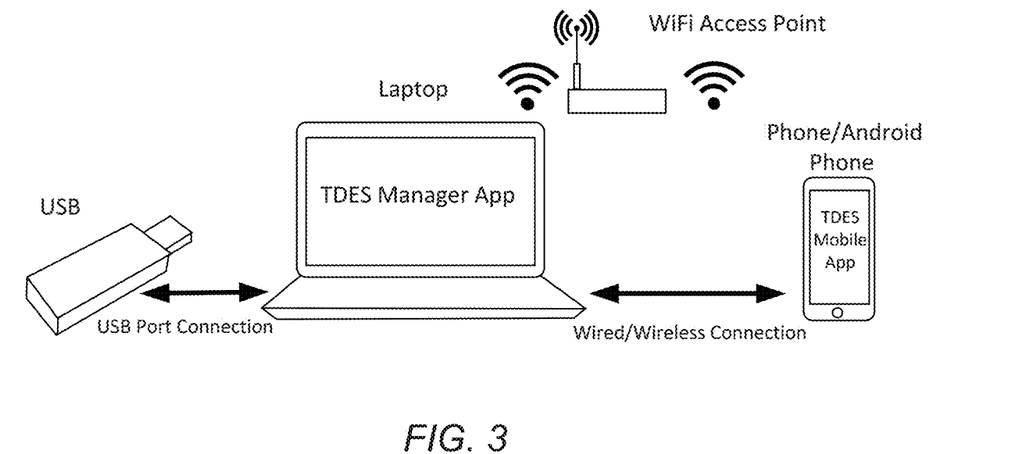
FIG. 3 depicts a schematic diagram of a targeted data extraction system (TDES) communication paradigm.

The TDES system creates a communication channel between the TDES Manager and the TDES App on the target smartphone. A similar paradigm is implemented for both iOS and Android based phones. The TDES communication paradigm is shown in FIG. 3. In an embodiment, the investigator in need of obtaining data from a mobile device is provided with a portable TDES Boot Drive (for example an SSD drive or USB stick) that is pre-loaded with items including: the boot loader for the operating system (e.g., Windows 10 OS), the TDES Manager and tools necessary to install the TDES App to the target smartphone. All extracted data is sent back to the TDES Boot Drive by the TDES App and reports on this data also reside on the TDES Boot Drive. Any available computer can be used to boot into the TDES Manager which runs off an isolated environment on the TDES Boot Drive. After booting up, the TDES Manager needs to have Internet access if the target device is an iOS device. The steps for targeted data extraction are: (1) The boot drive containing the TDES Manager is inserted into a laptop; (2) Windows 10 OS boots up and the TDES Manager starts running; (3) a wired connection, e.g., using a USB cable, is connected from the laptop to the mobile device. The TDES App is installed on the mobile device. If the mobile device is using iOS, a hotspot is needed to connect to Apple to: (a) code sign and (b) trust the developer. After the TDES App is downloaded the phone can be disconnected from the laptop; (4) a wireless or wired two-way communications channel is setup between the TDESManager and the TDES App for data transfer; and (5) targeted data extracted by the App is exported to the TDES Manager and reports are generated for the extracted data. In one embodiment, no copies of the data to be exported are stored on the mobile device in any intermediate form.

IOS TDES App Installation

Applications from sources approved by Apple are those that can be run on non-jailbroken iOS devices. iOS requires that all executable code must be signed with a certificate issued by Apple. Third-party apps need to be signed by a certificate to prevent loading of any tampered or self-modifying code. In one embodiment, Cydia Impactor is used to code sign the app. In an embodiment, an ".ipa" file of the TDES App using the XCode Archive utility is generated. IPA stands for iOS App Store Package and is an application archive file which stores an iOS device app. In order to code-sign, Cydia Impactor logs into the Apple Developer Center and downloads the developer's provisioning profile and iOS development certificate. Logging into the Apple Developer Center requires an Internet connection. Impactor signs the .ipa contents in a depth first manner starting with the deepest folder level. Once signing is completed, Impactor installs the IDES App onto the specified device. All these tasks may be automated using an AutoHotKey script that runs after the TDES Manager boots, thus requiring no actions by the investigator.

Android TDES App Installation

The Android OS requires that every application being installed to a device must be signed. As long as the application developed is signed and does not attempt to update another application, it can be self-signed. The output of the completed compilation is an apk file. Note that for Android no other authentication is necessary. Once the apk file is on the target device, the TDES App can be installed. For simplicity and ease of use an ADB (Android Debug Bridge) may be used that allows for communication between the host computer and a target device. To use ADB the target device must be put into USB Debugging Mode and after installation this mode is turned off.

TDES Data Transfer Protocol

An important aspect for the TDES App— TDES Manager communication channel is to ensure that the selected data that is extracted is sent with forensic integrity so that any modification of the data can be detected. Furthermore, if during the chain of custody of the data any changes are made, inadvertently or purposefully, this can also be detected. In one embodiment, forensic integrity can be accomplished through hashing most, or all, files and eventually creating a final hash value that is also exported to the TDES Manager. Hashing is preferably done on the mobile device. If needed this final hash could be sent to the phone's owner and or a third party. For Apple devices an analogous data transfer socket-based protocol is used for forensic integrity of the data. Since a hotspot is needed for validation of Apple devices and software, the TDES App—TDES Manager communication channel is used to transfer the data wirelessly. For Android, ADB is used, which supports socket level communications. Android applications are natively written in Java and thus ServerSockets and Sockets can be used. For the Android communication protocol a wired connection is preferred.

User Interface

A user interface runs as part of the TDES App on the target device and lets an investigator define the selected data to be extracted. In some embodiments, the interfaces are somewhat different on Apple devices and Android devices. An optional .pdf consent form is available on the TDES Manager. For Apple devices, after the data extraction is defined on the TDES App, a digital consent form defining exactly the data that is to be extracted can be signed on the App itself. For Android devices, a broad consent form is defined on the TDES App first. Then, this consent form is used to ensure that only a subset of the data allowed to be extracted is in fact defined using the Android TDES App.

In an embodiment, "bookmarking" may be implemented in the TDES App. Bookmarking works as follows. Suppose a data set has been extracted using a set of filters resulting in a selected data set. The investigator setting up these filters can display the results of the filtering and do a quick data review on the phone itself before deciding what data to actually export to the TDES Manager, this represents "bookmarked" data. For example, if a set of images of weapons in a certain time range has been selected, the investigator can do a review of the images to decide which subset of these are relevant to the investigation by bookmarking the relevant set. In some embodiments, implementations of the TDES App support bookmarking, no bookmarking allowed, and exporting both bookmarked and originally selected data.

iOS device App Interface

Figure 4:
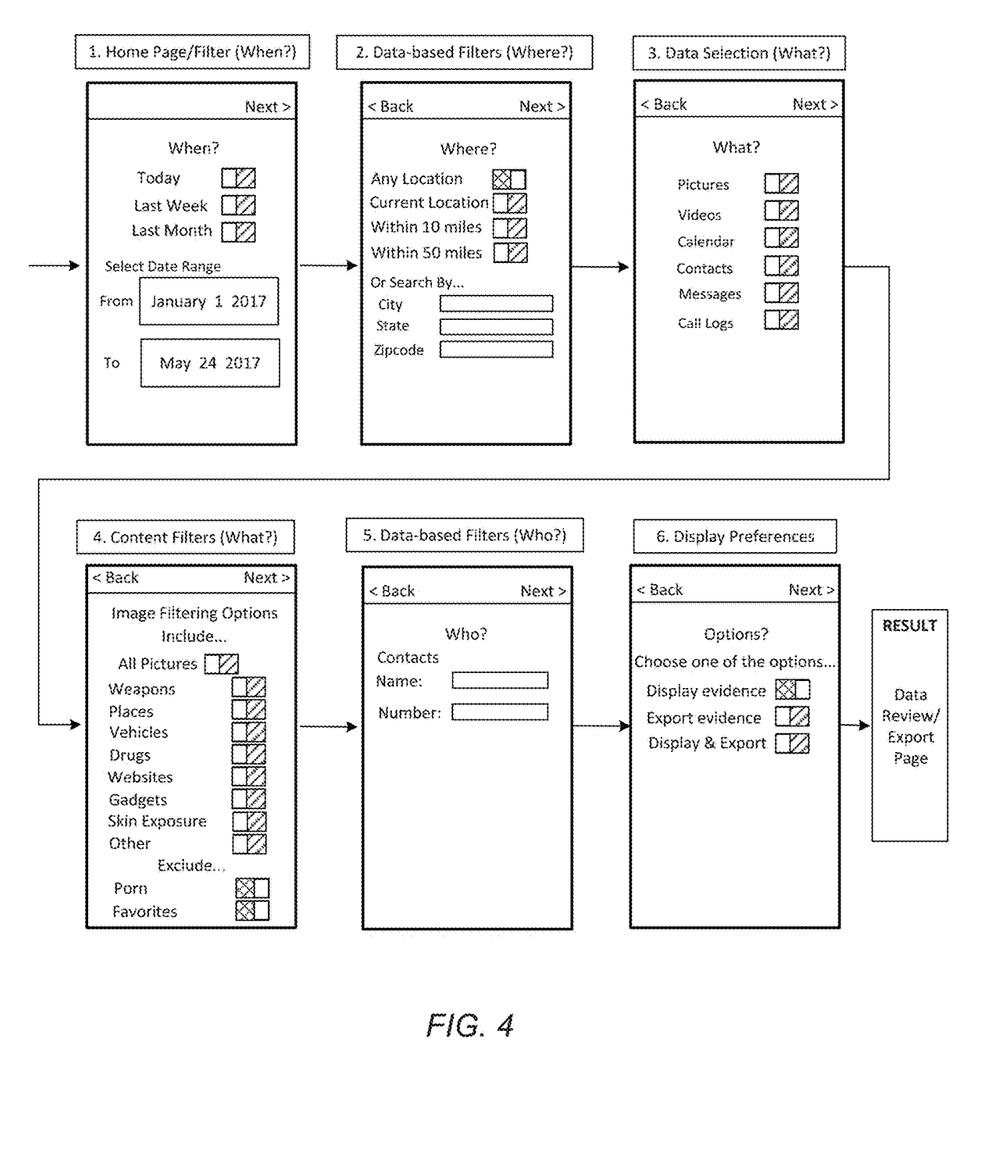
FIG. 4 depicts a user interface for an iOS-based phone.

FIG. 4 shows an exemplary iOS device TDES app interface. Initial choices to define are when (specific date ranges, today, last week, last month, etc.); where (current location, location within a certain number of miles, location determined by city, state, or zip code, etc.); and what (data type: photos, videos, calendar, call logs, messages and contacts). For each of these further filtering options can be defined (generally content filtering). For example, if what is "photos and videos", the content filtering options supported are the inclusion or the exclusion of: weapons, places, vehicles, drugs, websites, gadgets, skin exposure, porn and favorites. If the exclude skin-exposure option is selected then the App would filter out such images for display and export. The last screen displayed shows what is to be done with the selected data: display on the device, export, or both. A consent form also is displayed before the export. The choice Export sends the extracted information to the TDES Manager.

Android App Interface

Figure 5:
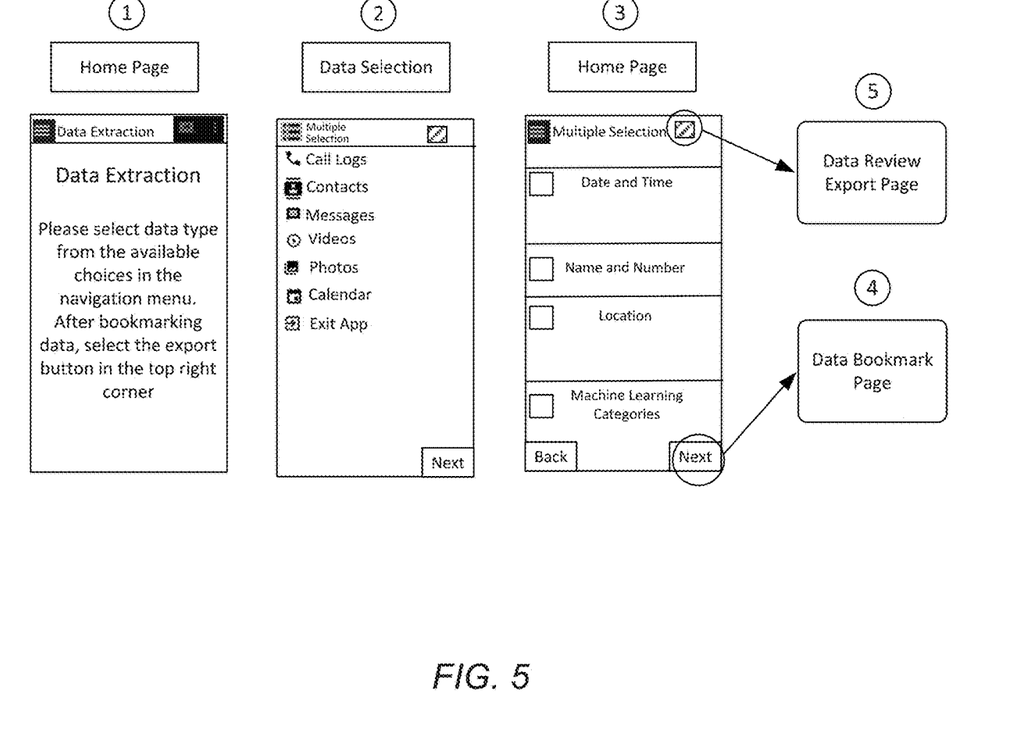
FIG. 5 depicts a user interface for an android-based smart phone.

The TDES Android App, in one embodiment, starts with the screen for specifying the data categories to be extracted. It supports the same categories of data as the iOS device App as shown in FIG. 5. Selecting any of these data types leads to a new screen with another set of choices providing further filtering options based on metadata and content specific filtering. The Android interface also has provisions for first defining a broad consent form that restricts the further data selections. The Android interface also supports bookmarking, display and export. For both versions, a fair amount of content and metadata filtering is possible. For example, call logs can be filtered by name and number as well as by date and time. Contacts can be filtered by name and number. Messages can be filtered by name and number as well as by date and time. Videos and photos can be filtered by location, date, time and various implemented content using ML models.

Reporting and Forensic Integrity of Exported Data

For the selected data export from the iOS device and Android Apps, a common interface was developed using the JSON object format. The JSON structure allows us to describe the extracted data, as well as information such as hashes and reporting information we may wish to collect using the TDES Apps. For example, as part of the report, we could indicate the time that the TDES App starts to run, when the extraction is completed, etc. Although the data transfer is primarily from TDES App to TDES Manager, we do get some information from the TDES Manager to the TDES App such as investigator name, device owner's name and case number. The Android TDES App can extract additional information such as MEI, phone number, and phone email address. For iOS this information must be entered in the TDES Manager. Tables 3 and 4 show pages one and two, respectively, of a sample report generated for an iOS device.

TABLE 3

| TARGETED DATA REPORT | |
|---|---|
| Section 1. - Case Summary | |
| Device Information | IMEI: 356xxxxxxxxxxxxxxxxx |
| | Phone Number: +1(98x)xxx-xxxx |
| Device Owner Information | Device Owner Name: Sally Smith |
| | Email ID: sally@sxxxh.com |
| Investigation Information | Date/Time: Apr. 4, 2018 3:28:6 (GMT) |
| Investigator Information | John Doe |
| Case ID | Case 0 |

TABLE 3-continued

| TARGETED DATA REPORT | |
|---|---|
| Section 2 - Filtered Data | |
| Photos | Yes |
| Videos | No |
| Messages | No |
| Call Logs | No |
| Contacts | Yes |
| Calendar | No |
| Section 3 - Filtering Options | |
| Date From | Dec. 25, 2017 |
| Date To | Dec. 26, 2017 |
| Location | — |
| Specific Contact Name | Robert |
| Specific Contact Number | — |
| Advanced Filters (Inclusions) | Weapons, Places |
| Advanced Filters (Exclusions) | Favorites |
| Section 4 - Artifact Items Summary | |
| Number of photos retrieved | 3 |
| Number of contacts retrieved | 2 |

TABLE 4

| Section 5 - Individual Artifacts | | |
|---|---|---|
| Section 5.1 - Photos | | |
| S. No | Thumbnail | Detailed Description |
| 1 | Photo 1 | File Name: It1_Photo_Camera_1.JPG |
| | | Path on Device: |
| | | File:///var/mobile/Media/DCIM/100APPLE/IMG_0338.JPG |
| | | Export Path: |
| | | export/Case 0/Iteration-1/It1_Photos/Camera/It1_Photo_Camera_1.JPG |
| | | Creation Date: Dec. 25, 2017, 3:28:6 (GMT) |
| | | Location: Not Found |
| 2 | Photo 2 | File Name: It1_Photo_Camera_2.PNG |
| | | Path on Device: |
| | | File:///var/mobile/Media/DCIM/100APPLE/IMG_0342.PNG |
| | | Export Path: |
| | | export/Case 0/Iteration-1/It1_Photos/Camera/It1_Photo_Camera_2.PNG |
| | | Creation Date: Dec. 25, 2017, 3:28:20 (GMT) |
| | | Location: Not Found |
| 3 | Photo 3 | File Name: It1_Photo_Camera_3.JPG |
| | | Path on Device: |
| | | File:///var/mobile/Media/DCIM/100APPLE/IMG_0342.PNG |
| | | Export Path: |
| | | export/Case 0/Iteration-1/It1_Photos/Camera/It1_Photo_Camera_2.PNG |
| | | Creation Date: Dec. 25, 2017, 3:28:20 (GMT) |
| | | Location: Not Found |
| Section 5.2 - Contacts | | | |
| S. No. | First Name, Last Name | Phone Number | Country Code |
| 1 | Robert | +59XXXXXXXXXX | EC |
| 2 | Robert | +1XXXXXXXXXX | US |
| -END OF REPORT- | | | |

TDES Directory Structure on the Boot Drive

Figure 6:
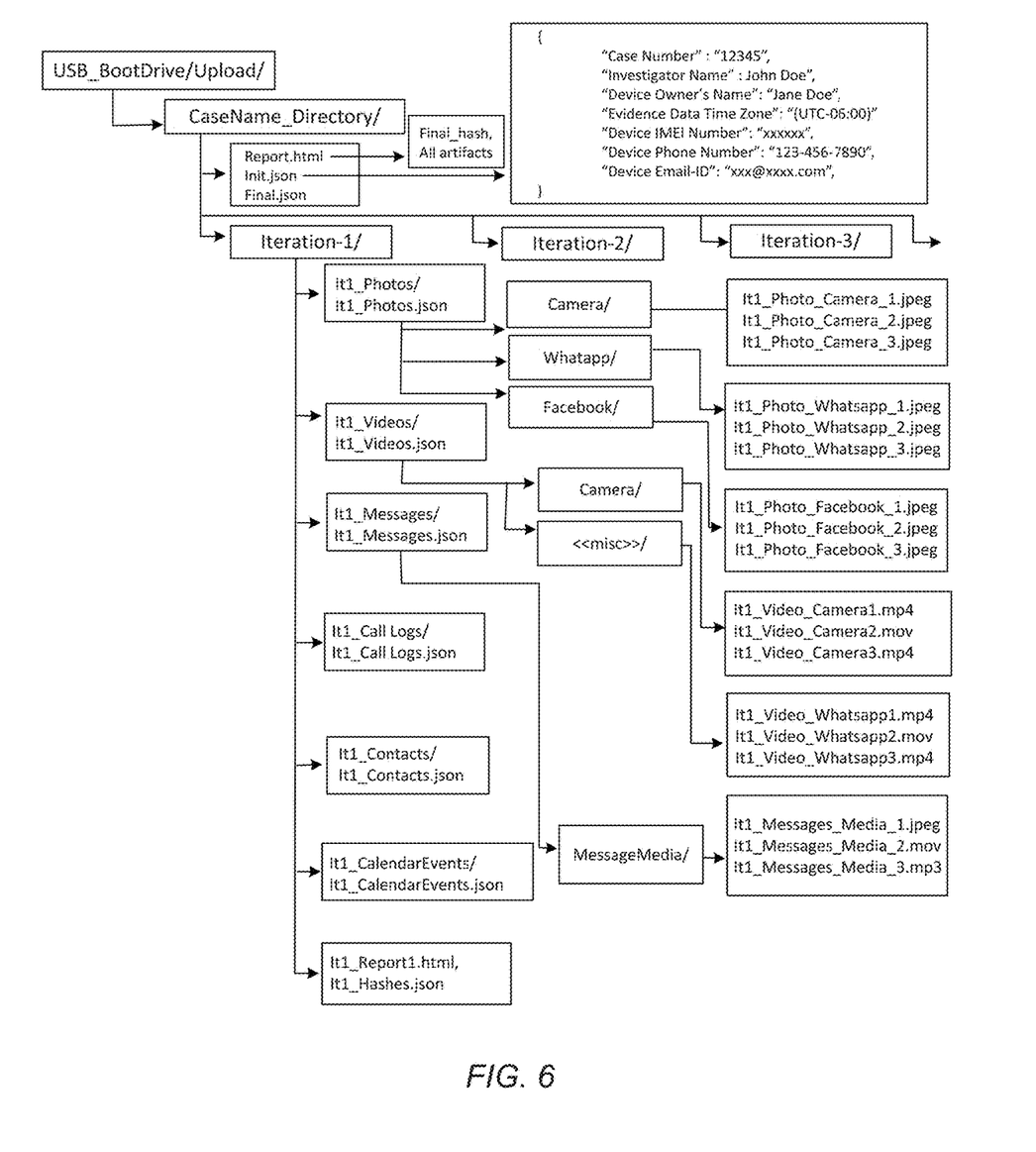
FIG. 6 depicts an exemplary directory structure created for storing evidence on the portable device.

An exemplary directory structure created for storing evidence on the boot drive, insuring integrity of the data and for reporting purposes, is shown in FIG. 6. In FIG. 6, Case directories are created for each case that the investigator is handling. Inside the Case directory, the actual full report is the file Report.html. The .json files including Final.json are described in the next section. Extracted information is stored as one or more iterations of requests made by the investigator. For each iteration, each category of data has a directory associated with it and a .json file associated with this directory.

JSON Format for Data Transfer

Figure 7:
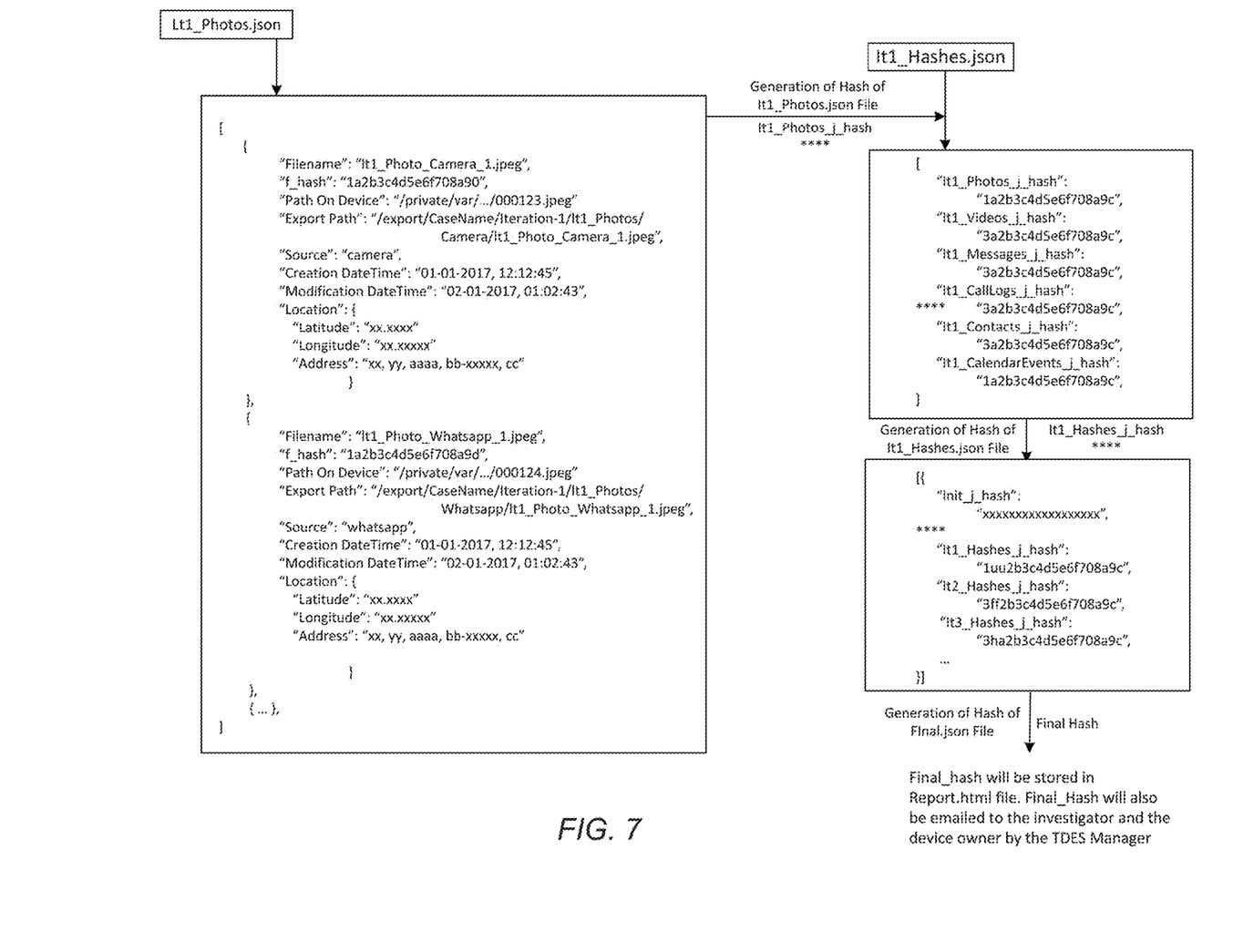
FIG. 7 an exemplary JSON data structure.

JSON format is used to describe the structure of the exported data and the Report Manager uses this to create appropriate reports in HTML format. An example of a JSON format is illustrated in FIG. 7.

The following example illustrates how JSON format helps with data transfer. In this example a set of photos have been retrieved using metadata and content filters. Auxiliary information about each photo will be transferred along with the actual image file. Both TDES Apps create this information in the same format. Once this is transferred to the TDES Manager, the Report Manager uses the full information to create the actual report. Various hashes are also transferred as part of the JSON files. As shown It1_Photos.json, the file is structured into arrays of arrays containing (Key, Value) pairs. For example, creation_plate is a key and its value is the string 01-01-2017. A lot of information is therefore exported in the JSON file. The key filename has a value string associated with it that is the name of the actual photo image. The actual image is stored as a separate file as defined by the key exportpath. Note also that the hash value of the actual photo file is stored within this JSON structure and is defined by the key f_hash.

Hashing and Data Integrity

In one embodiment, SHA-1 hashes are used to ensure the integrity of the data transferred to TDES Manager. Other types of hashes could be used. For each filename defined in a JSON file a hash associated with the filename called the f_hash is created. For example, consider the Itl Photos.json file in FIG. 7 in Appendix A and the key filename with value It1_Photo_Camera_1.jpeg. There is an f_hash associated with it (shown in the figure) since the actual file is stored in a separate location. Thus any file in our directory that is not a JSON file has a hash value stored in some JSON file. Next, for every JSON file there is a JSON hash (j_hash) associated with that file. For example the hash value computed on the file It1_Photos.json is stored as the key It1_Photos_j_hash in the file It1_Hashes.json. For each iteration n, the hash of Itn_Hashes.json is stored in the Final.json file. The hash of Final.json is called Final_hash. Note that the Final_hash ensures that no file in any Case directory can be modified without detection. The Final_hash computed by a TDES App is sent to the TDES Manager and stored in Report.html. The TDES Manager can independently compute the Final_hash to check if there were any changes during the actual transfer. Hashes are computed at intermediate points for several reasons, including ease in granular transfer of data and checking if the transfer is correct. Checking extracted files against known files is also simplified. The TDES Manager (or TDES App) could also email a copy of the Final_hash to the phone owner, investigator or third party.

Examples

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

A series of experiments were conducted with a prototype system (Tables IV-VI for iOS; Tables VII-VIII for Android) for accuracy and speed with respect to selective filtering. For metadata filtering, accuracy should be 100% since native frameworks of Apple and Android are used. However a manual check was also performed for the metadata filtering. The TDES system was compared to two commercial tools (Paraben EEE and Magnet Axiom; Table IX) used by law enforcement. Neither of these tools (nor Cellebrite) are capable of doing selective data extraction in the manner we have described. Although we did not evaluate against Cellebrite, essentially these tools do a physical acquisition of all the data on the phone and then allow the user to analyze the data extracted off-line. This paradigm is used irrespective of data category analyzed.

Three Android based phones and three iOS devices were used. Detailed configurations of the phones are summarized in Table III. Apple Dev-I and Dev-III contain real user data. Dev-II contains synthetic data, non-copyrighted and available for reuse from the Internet. Similarly, Android Dev-V and Dev-VI contain real user data and Dev-IV contains synthetic data. The table shows the total number of artifacts on the devices for each data category. The TDES boot drive was a SanDisk Extreme 128 GB stick and the laptop was a ThinkPad X1 Carbon (only used to boot drive and connect phones).

TABLE III

Devices Used for Experiments and Summary of Contents

| Model/Version | Storage | CPU | NIC | Photos | Videos | Messages | Call Logs | Contacts | Calendar |
|---|---|---|---|---|---|---|---|---|---|
| Dev-I: iPhone-8 (iOS v11.2.1) | 256 GB | Apple A10 Fusion | Lightning port | 10,307 | 178 | 208 | 482 | 1102 | 148 |
| Dev-II: iPhone-7 (iOS v11.2.5) | 128 GB | Apple A10 Fusion | Lightning port | 2,621 | 109 | 5 | 155 | 6 | 46 |
| Dev-III: iPhone-6 Plus (iOS v11.2.2) | 16 GB | Apple A8 | Lightning port | 2,566 | 102 | 15,978 | 714 | 384 | 265 |
| Dev-IV: Samsung Galaxy S7 (v7.0, Nougat) | 32 GB | Octa-cure Exynos | Micro-USB 2.0 | 100 | 6 | 37 | 7 | 20 | 17 |
| Dev-V: Moto G3 (v6.0, Marshmallow) | 16 GB | Quad-core 1.4 GHz Cortex-A53 | Micro-USB 2.0 | 191 | 7 | 25,420 | 429 | 1889 | 780 |

TABLE III-continued

Devices Used for Experiments and Summary of Contents

| Model/Version | Storage | CPU | NIC | Photos | Videos | Messages | Call Logs | Contacts | Calendar |
|---|---|---|---|---|---|---|---|---|---|
| Dev-VI: Samsung Galaxy S7 Edge (v7.0, Nougat) | 32 GB | Quad-core Snapdragon 820 | Micro-USB 2.0 | 249 | 22 | 13,362 | 500 | 240 | 337 | iOS: Table IV shows results of experiments (only Dev-I and Dev-II used) for on-device metadata based filtering for iOS devices. Each of the 12 experiments defines a category of data and filters used. For each experiment, the total number of artifacts selected out of the total number of artifacts on the device is shown for each device. For example in experiment #10, on Dev-I, 91 photos were retrieved from 10,307 photos on the device. The metadata filtering was 100% accurate based on checking the devices manually (using phones features such as Photos Album count). The time to display the data (Display Time) on the target device and time to export the data to the TDES Manager (Export Time) are also shown. The observed times show that TDES can be used for practical in-field targeted data extraction. The size of the exported data is also shown. For these experiments, a wired connection was used for data transfer.

TABLE IV

Metadata Based Filtering on iPhones

| Category | Metadata Filter | Dev-I Artifacts | Dev-II Artifacts | Display Time-I | Display Time-II | Export Time-I | Export Time-II | Size-I | Size-II |
|---|---|---|---|---|---|---|---|---|---|
| 1-Photos | Date: Dec. 24, 2017-Dec. 27, 2017 | 2/10,307 | 90/2,621 | 0.7 sec | 0.38 sec | 3.58 sec | 33.63 sec | 2.33 MB | 12.4 MB |
| 2-Photos | Location: Within 10 miles* | 418/10,307 | 86/1,621 | 1.2 sec | 0.65 sec | 42 m 64 sec | 5 m 37 sec | 822 MB | 183 MB |
| 3-Videos | Date: Sep. 1, 2017-Jan. 31, 2018 | 34/178 | 61/109 | 1.26 sec | 3.02 sec | 51 m 11 sec | 13 m 6 sec | 1.38 GB | 4463 MB |
| 4-Videos | Location: Within 10 miles* | — | 9/109 | — | 13.35 sec | — | 4 m 28 sec | — | 135 MB |
| 5-Videos | Location: Current Location* | 4/178 | — | 0.2 sec | — | 17 m 2 sec | — | 405 MB | — |
| 6-Contacts | Name: "Puppy" | 3/1102 | — | 2.57 sec | — | 0.6 ms | — | — | — |
| 7-Contacts | Name: "Robert" | — | 1/6 | — | 2.06 sec | — | 0.8 ms | — | — |
| 8-Contacts | Number: +*(*)*-*** | 1/1102 | 1/6 | 0.12 sec | 0.02 sec | 0.8 ms | 0.8 ms | — | — |
| 9-Calendar | Date: Jan. 1, 2018-Jan. 15, 2018 | 19/148 | 1/46 | 0.14 sec | 0.05 sec | 0.6 ms | 0.7 ms | — | — |
| 10-Photos, Videos | Date: Aug. 30, 2017-Sep. 15, 2017, Location: Any | 91/10,307 (P), 1/178 (V) | 140/2,621 (P), 5/109 (V) | 0.7 sec | 0.56 sec | 4 m 1 sec | 2 m 23 sec | 236 MB | 81.9 MB |
| 11-Photos, Videos | Date: Aug. 31, 2017, Loation: With 50 miles | 9/10,307 (P), 1/178 (V) | 0/2,621 (P), 1/109 (V) | 0.73 sec | 0.35 sec | 1 m 01sec | 12.61 sec | 51 MB | 6.47 MB |
| 12-Videos | Date: Last Week Location: Within 10 miles | 3/178 (V) | 4/5 (V) | 0.4 sec | 0.41 sec | 1 m 2sec | 1 m 19 sec | 7 MB | 44.6 MB |

Table V shows results of experiments (using only Dev-III) for off-line based metadata filtering for messages and call logs. For these categories of data for iOS devices, as previously discussed, we must use extraction via a backup by the TDES Manager and hence there is no export time. Note, however, that filtering is still specified by the investigator on the TDES App. The accuracy of the metadata filtering is again 100%, based on manual analysis using appropriate software for analyzing iOS backups.

TABLE V

Backup Based Filtering for iPhones

| Category | Metadata Filter | Dev-III Artifacts | Display Time-III |
|---|---|---|---|
| 1-Messages | None | 15,978/15,978 | 1.95 sec |
| 2-Messages | Date: Oct. 3, 2017-Dec. 30, 2017 | 510/15,978 | 0.33 sec |
| 3-Messages | Number: +*(*)*-*** | 1016/15,978 | 0.29 sec |
| 4-Call Logs | None | 683/683 | 0.29 sec |
| 5-Call Logs | Date: Jan. 14, 2017-Aug. 14, 2017 | 297/683 | 0.27 sec |
| 6-Call Logs | Number: +*(*)*-*** | 40/683 | 0.27 sec |

TABLE V-continued

Backup Based Filtering for iPhones

| Category | Metadata Filter | Dev-III Artifacts | Display Time-III |
|---|---|---|---|
| 7-Messages | Date: Jan. 14, 2017- Aug. 14, 2017 | 738/15,978 (Messages), 35/683 (Call Logs) | 0.32 sec |
| Call Logs | Number: +*(*)*-*** | | |
| 8-Messages | Number: +*(*)*-*** | 1,016/15,978 (Messages) 40/683 (Call Logs) | 0.28 sec |
| Call Logs | | | |

Table VI shows results for a series of experiments (using only Dev-II) for Photos for various combinations of metadata and content filtering. There were 2621 photos on the device with 109 photos in the date ranges 12-25-17 to 12-29-17 and 72 of these taken on 12-25-17. Inception-v3 model was used for content filtering of items shown in the third column. Rows 1-3 of the table focus on weapons and in row 2 since none of the weapon photos were taken within 10 miles of the phone, content filtering was not applied. In rows 4-9, the focus is on content filters likely relevant to law enforcement. The confusion matrix (columns TP, FN FP, TN) for each row shows retrieval results for this series of experiments. The Accuracy Measure (TP+TN)/(TP+FN+FP+TN) column summarizes how well the Inception-v3 models does for the content filtering. Times for display and export are also shown. We note that customized neural network models relevant for law enforcement use may be used to improve accuracy.

TABLE VI

On-device Metadata and Content Based Filtering on iPhones Using Inception-Model

| Category | Metadata Filter | Content-Filter | TP | FN | FP | TN | Display Time-II | Export Time-II | Accuracy Measure (%) |
|---|---|---|---|---|---|---|---|---|---|
| 1-Photos | Date: Dec. 25, 2017 | Weapons | 17 | 2 | 0 | 53 | 9.82 sec | 4.69 sec | 97.22 |
| 2-Photos | Location: Within 10 miles | Weapons | — | — | — | — | 20.31 sec | — | — |
| 3-Photos | Date: Dec. 25, 2017-Dec. 29, 2017 | Weapons | 17 | 4 | 2 | 86 | 19.05 sec | 4.34 sec | 94.50 |
| 4-Photos | Date: Dec. 25, 2017-Dec. 29, 2017 | Places | 19 | 9 | 4 | 77 | 17.73 sec | 9.93 sec | 88.07 |
| 5-Photos | Date: Dec. 25, 2017-Dec. 29, 2017 | Vehicles | 5 | 0 | 0 | 104 | 17.06 sec | 0.72 sec | 100 |
| 6-Photos | Date: Dec. 25, 2017-Dec. 29, 2017 | Drugs | 2 | 4 | 0 | 103 | 16.26 sec | 0.33 sec | 96.33 |
| 7-Photos | Date: Dec. 25, 2017-Dec. 29, 2017 | Websites | 5 | 1 | 0 | 103 | 16.66 sec | 7.03 sec | 99.08 |
| 8-Photos | Date: Dec. 25, 2017-Dec. 29, 2017 | Gadgets | 11 | 8 | 3 | 87 | 17.33 sec | 7.88 sec | 89.91 |
| 9-Photos | Date: Dec. 25, 2017-Dec. 29, 2017 | Skin Exposer | 12 | 0 | 0 | 97 | 16.23 sec | 8.68 sec | 100 |

Table VII shows results for experiments (using Dev-IV and Dev-V) for on-device metadata filtering for Android phones. Results for a variety of combinations of data categories and metadata filters are shown. Each experiment (numbered from 1 to 18) shows the categories of data and the filters used. Note that the display and export times are very good. In experiment 18 for Dev-V, device artifacts totaling 236 MB took 18.2 seconds to export.

TABLE VII

On-device Metadata Based Filtering for Android Phones

| Category | Meta-Filter | Dev-IV Artifacts | Dev-V Artifacts | Display Time-IV (sec) | Display Time-V (sec) | Export Time-IV (sec) | Export Time-V (sec) | Size-IV | Size-V |
|---|---|---|---|---|---|---|---|---|---|
| 1-Photos | Date: Feb. 3, 2018-Feb. 5, 2018 | 22/100 | 2/191 | 0.86 | 0.31 | 4.65 | 2.32 | 9.50 MB | 6.56 MB |
| 2-Photos | Location: Current Locations | 4/100 | 1/191 | 0.56 | 0.63 | 2.5 | 10.58 | 4.50 MB | 4.61 MB |
| 3-Videos | Date: Dec. 19, 2017-Feb. 3, 2018 | 1/6 | 3/7 | 0.45 | 0.89 | 1.08 | 3.91 | 9.45 MB | 16.6 MB |
| 4-Videos | Location: Current Locations | 6/6 | 7/7 | 1.69 | 0.90 | 10.76 | 13.09 | 144 MB | 190 MB |
| 5-Calendar | Date: May 29, 2017-May 30, 2017 | 1/17 | 85/780 | 0.62 | 1.03 | 1.02 | 2.4 | 1 KB | 13 KB |
| 6-Messages | Name: aaabb | 14/37 | 32/25,420 | 1.02 | 1.23 | 3.56 | 14.23 | 5 KB | 7 KB |
| 7-Messages | Number: +*(*)*-*** | 1/37 | 5/25,420 | 0.42 | 0.92 | 1.02 | 1.25 | 2 KB | 4 KB |
| 8-Call Logs | Name: aaabb | 1/7 | 9/429 | 0.22 | 0.49 | 1.02 | 6.59 | 2 KB | 5 KB |
| 9-Call Logs | Number: +*(*)*-*** | 2/7 | 11/429 | 0.47 | 0.89 | 1.99 | 11.2 | 2 KB | 6 KB |
| 10-Messages Photos Videos | Number: +*(*)*-*** Date: Jan. 28, 2018-Feb. 5, 2018 Location: Current Location | 4/37 23/100 1/37 | 100/25,420 6/191 7/7 | 1.02 | 1.25 | 11.02 | 14.08 | 154.8 MB | 199.1 MB |
| 11-Messages Call Logs | Date: Dec. 12, 2017-Feb. 5, 2018 Number: +*(*)*-*** | 1/7 15/37 | 1000/25,420 8/429 | 0.44 | 1.02 | 0.98 | 3.89 | 3 KB | 258 KB |
| 12-Messages Calendar Photos Videos | Date: Sep. 12, 2017-Sep. 29, 2017 Date: Sep. 12, 2017-Sep. 29, 2017 Location: Current Location Location: Current Location | 2/17 3/17 4/100 6/6 | 300/25,420 5/780 1/191 7/7 | 1.89 | 1.65 | 10.2 | 18.2 | 148.5 MB | 236.1 MB |

Table VIII shows experiments for extracting photos (with Dev-IV) using both metadata filtering and content based filtering and the MobileNet model from TensorFlowLite. The time results are excellent. But it will clearly be useful to develop specific ML models for law enforcement to improve content filtering accuracy.

the only choices available for acquisition are the broad categories of data as shown in Table IX. Paraben does not extract Photos and Videos separately but rather only has the option of all media artifacts. However in the experiments performed it was observed that selecting this option resulted in extraction of only the metadata for the media artifacts and

TABLE VIII

On-device Metadata and Content Based Filtering on Android Phones Using MobileNet Model

| Category | Metadata Filter | Content-Filter | TP | FN | FP | TN | Display Time-IV | Export Time-IV | Accuracy Measure (%) |
|---|---|---|---|---|---|---|---|---|---|
| 1-Photos | Date: Nov. 12, 2017-Feb. 2, 2018 | Weapons | 12 | 16 | 2 | 44 | 35 sec | 1.5 sec | 75.68 |
| 2-Photos | Location: Current Location | Weapons | 3 | 0 | 0 | 4 | 1.3 sec | 0.81 sec | 100 |
| 3-Photos | Date: Oct. 12, 2017-Dec. 2, 2017 | Vehicles | 0 | 4 | 2 | 2 | 37.4 sec | 1.56 sec | 25 |
| 4-Photos | Location: Current Location | Vehicles | 2 | 0 | 0 | 5 | 1.4 sec | 1.3 sec | 100 |
| 5-Photos | Date: Dec. 1, 2017-Jan. 13, 2018 | Drugs | 1 | 5 | 0 | 57 | 34.69 sec | 1.2 sec | 92.06 |
| 6-Photos | Location: Current Location | Drugs | 0 | 2 | 0 | 5 | 1.2 sec | 0 sec | 71.43 |
| 7-Photos | Date: Aug. 11, 2017-Dec. 31, 2017 | Skin Exposure | 8 | 5 | 1 | 63 | 33.08 sec | 2.48 sec | 92.21 |

Comparison with Commercial Tools

As mentioned previously, the experimental system was compared to the commercial systems Paraben and Magnet Axiom. Android Dev-VI and iOS device Dev-H was used for the experiments. Results are shown in Table IX. In the table, App Installation Time (AIT) denotes the time it takes from the instant the target device (iOS or Android) is connected to the Laptop to the instant a choice can be made for data selection. Also note that for TDES the exported data is stored on a flash drive whereas for both Paraben and Magnet Axiom, the exported data is stored on the hard drive of the laptop.

not the artifacts themselves. For Magnet Axiom there is a separate option of exporting Video Artifacts which is a preview of the video as a PNG file.

iOS Comparison

For iOS TDES App the installation time was 52 seconds. For iOS extraction both Paraben and Magnet Axiom first create a backup. For Paraben backup creation happens with application initialization (10 minutes) whereas for Magnet Axiom a separate backup creation step that takes 38 minutes 54 seconds after 9 minutes of initialization. Note that for TDES backup acquisition time is only required when extracting Call Logs or Messages.

TABLE IX

Export Time Comparisons

| OS | Summary | Export Time for TDES (USB) | Export Time for Paraben (HDD) | Export Time for Magnet AXIOM (HDD) |
|---|---|---|---|---|
| Android (Dev-VI) | App Installation Time (AIT) | 14 s | 5 s | Na |
| | Backup Acquisition Time (BAT) | NA | NA | 29 m |
| | Call Logs | 1 s | 40 s | 1 m 17 s |
| | Messages | 4 m 9 s | 17 m 3 s | 1 m 21 s |
| | Photos | 42 s (249 files) | NA | 14 m 41 s (13.711 files) |
| | Videos | 14 s (22 files) | NA | 1 m 38 s (62 files) |
| | Contacts | 1 s | 2 m 11 s | 1 m 11 s |
| | Calendar | 6 s | 1 m 5 s | 1 m 14 s |
| | ALL Media | NA | 43 s (Metadata Only) | NA |
| iOS (Dev-II) | APP Installation Time (AIT) | 52 sec | 10 m | 9 m |
| | Backup Acquisition Time (BAT) | 26 m (2 GB) | Approx 20 m (2.15 GB) | 38 m 54 sec (4.1 GB) |
| | Extraction time of Call Logs | (BAT) 15 ms | 0.1 sec | 0.4 sec |
| | Extraction time of Messages | (BAT) 16 ms | 0.1 sec | 0.3 sec |
| | Extraction time of Contacts | 1.8 ms | 0.2 sec | 0.3 sec |
| | Extraction time of Calendar | 2 ms | 0.2 sec | 0.3 sec |
| | Extraction time of Photos | 39 m 3 sec (2.621 files) | NA | 80 m (29,488 files, 2.30 GB) |
| | Extraction time of Videos | 30 m 15 sec (109 files) | NA | 4 m (438 files, 1.73 GB) |
| | Extraction time of All Media | Not Needed | 32 m (11,460 files, 1.6 GB) | 93 m (48,701 files, 2.69 GB) |
| | Extraction time of Video Artifacts | NA | NA | 2 sec (219 files, 268 MB) |

Android Comparison

The Android TDES App installation time was 14 seconds. Note that Magnet Axiom uses backup based acquisition. Hence for extraction of any artifact a backup must first be created. For example, for extracting Call Logs, first a backup must be created which takes 29 minutes and then Call Logs can be obtained in 1 minute 17 seconds. For the TDES App the corresponding time is 14 seconds for the TDES App installation and 1 second for the export. For Paraben the corresponding time is 5 seconds for the initialization and 40 seconds for the export. For both Paraben and Magnet Axiom

CONCLUSION

Described herein is a design and development of a system that can perform targeted data extraction from smartphones based on both metadata filtering and content based filtering. The TDES system assumes the phone is voluntarily provided to law enforcement but also includes the case where a court orders that a passcode must be provided. Another application of the TDES system is when a memory dump can be done and the file system is intact.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A portable device for selective extraction of data from a mobile device, wherein the portable device is couplable to a computer system, and wherein the portable device comprises:
   a non-transitory memory medium, wherein the non-transitory memory medium has a targeted data extraction manager and a targeted data extraction app stored therein, wherein, when coupled to a computer system, the targeted data extraction manager boots up in the computer system and installs the targeted data extraction app onto the mobile device,
   wherein the targeted data extraction app comprises a data identification component, the data identification component configured to identify data on the mobile device according to a user's search criteria;
   wherein the targeted data extraction app comprises a data acquisition component, the data acquisition component configured to extract only the data identified by the data identification component from the mobile device;
   wherein the targeted data extraction app comprises a data validation component, wherein the data validation component is configured create one or more validation files which include information that can be used to detect errors during transferring of the extracted data from the mobile device to the targeted data extraction manager and/or tampering of the extracted data; and
   wherein the targeted data extraction app comprises a data transfer component, the data transfer component configured to transfer the data extracted from the mobile device and the one more validation files to the targeted data extraction manager on the portable device.

2. The system of claim 1, wherein the data transfer system transfers data from the mobile device to the targeted data extraction manager via a wireless connection.

3. The system of claim 1, wherein the targeted data extraction manager is located on a USB drive.

4. The system of claim 1, wherein the targeted data extraction manager comprises a boot loader for the operating system of the computer system.

5. The system of claim 1, wherein the one or more validation files are hash files.

6. The system of claim 5, wherein a hash file is generated for each data file extracted.

7. The system of claim 1, wherein the targeted data extraction app comprises a user interface that is displayed on the mobile device during use.

8. The system of claim 1, wherein the targeted data extraction app provides a consent form on a display of the mobile device, wherein the consent form is signed, during use, by the owner of the phone, to allow release of the extracted data.

9. The system of claim 1, wherein the targeted data extraction app comprises a preview component that allows a user to review the extracted data before sending the data to the targeted data extraction manager.

10. A method for selective extraction of data from a mobile device, comprising:
    coupling a portable device onto a computer system, wherein the portable device comprises a non-transitory memory medium, wherein the non-transitory memory medium has a targeted data extraction manager and a targeted data extraction app stored therein;
    coupling the mobile device to the computer system;
    running the targeted data extraction manager on the computer system, wherein the targeted data extraction manager installs the targeted data extraction app from the portable device on to the mobile device;
    running the targeted data extraction app on the mobile device, wherein the targeted data extraction app creates a user interface on the mobile device;
    extracting data selected by a user through the user interface, wherein the data is extracted by the targeted data extraction app, and wherein the targeted data extraction app extracts only the data selected by the user from the mobile device
    creating one or more validation files which include information that can be used to detect errors during transferring of the data extracted from the mobile device to the targeted data extraction manager and/or tampering of the data extracted from the mobile device; and
    transferring the data extracted from the mobile device and the one or more validation files to the targeted data extraction manager on the portable device.

11. The method of claim 10, wherein the data extracted from the mobile device is transferred from the mobile device to the targeted data extraction manager via a wireless connection.

12. The method of claim 10, wherein the portable device is a USB drive.

13. The method of claim 10, wherein the non-transitory memory medium comprises a boot loader for the operating system of the computer system.

14. The method of claim 10, wherein the one or more validation files are hash files.

15. The method of claim 14, wherein a hash file is generated for each data file extracted.

16. The method of claim 10, further comprising providing a consent form on a display of the mobile device, wherein the consent form is signed, during use, by the owner of the phone, to allow release of the extracted data.

17. The method of claim 10, further comprising presenting a preview of the data selected by the user on the mobile phone before sending the data to the portable device.

* * * * *

UNITED STATES PATENT AND TRADEMARK OFFICE
CERTIFICATE OF CORRECTION

| | |
|---|---|
| PATENT NO. | : 11,513,812 B2 |
| APPLICATION NO. | : 16/735092 |
| DATED | : November 29, 2022 |
| INVENTOR(S) | : Sudhir Aggarwal |

It is certified that error appears in the above-identified patent and that said Letters Patent is hereby corrected as shown below:

In the Claims

Claim 1, Column 21, Line 48, please add -- or -- after "device and the one" and before "more validation"

Signed and Sealed this
Ninth Day of May, 2023

*Katherine Kelly Vidal*
Katherine Kelly Vidal
*Director of the United States Patent and Trademark Office*